(12) United States Patent
Zitsch et al.

(10) Patent No.: US 11,169,331 B2
(45) Date of Patent: Nov. 9, 2021

(54) FLEXIBLE OPTICAL CIRCUIT WITH INTEGRATED FIBER BREAKOUT

(71) Applicant: TE Connectivity Corporation, Berwyn, PA (US)

(72) Inventors: Dwight David Zitsch, Carlisle, PA (US); James Leo Barry, Harrisburg, PA (US)

(73) Assignee: TE CONNECTIVITY SERVICES GmbH, Schaffhausen (CH)

( * ) Notice: Subject to any disclaimer, the term of this patent is extended or adjusted under 35 U.S.C. 154(b) by 0 days.

(21) Appl. No.: 16/562,023

(22) Filed: Sep. 5, 2019

(65) Prior Publication Data

US 2021/0072463 A1    Mar. 11, 2021

(51) Int. Cl.
*G02B 6/36* (2006.01)
*G02B 6/44* (2006.01)

(52) U.S. Cl.
CPC ......... *G02B 6/3608* (2013.01); *G02B 6/4403* (2013.01)

(58) Field of Classification Search
CPC .............................. G02B 6/3608; G02B 6/4403
USPC ......................................................... 385/14
See application file for complete search history.

(56) References Cited

U.S. PATENT DOCUMENTS

| 6,619,853 B2 | 9/2003 | Grois et al. |
| 10,107,967 B1 | 10/2018 | Butler et al. |
| 2002/0154882 A1* | 10/2002 | Moran ................. G02B 6/3885 385/137 |
| 2003/0103743 A1 | 6/2003 | Sun et al. |
| 2004/0161212 A1 | 8/2004 | Sun et al. |
| 2007/0122085 A1* | 5/2007 | Takahashi ............. G02B 6/368 385/83 |
| 2017/0045693 A1* | 2/2017 | Hodge ................ G02B 6/3608 |
| 2019/0025521 A1 | 1/2019 | Geens et al. |

FOREIGN PATENT DOCUMENTS

| JP | 2002 211945 A | 7/2002 |
| WO | 2014 052446 A1 | 4/2014 |

OTHER PUBLICATIONS

European Search Report, dated Feb. 3, 2021, EP 20 19 4522, European Applikcation No. 20194522.7-1001.

* cited by examiner

*Primary Examiner* — Jerry M Blevins

(57) ABSTRACT

A flexible optical circuit comprising: (a) a flexible substrate defining a perimeter; (b) an adhesive layer on at least a portion of said substrate; (c) a plurality of fibers laid out on said adhesive layer, wherein each end of each fiber of said plurality of fibers extends from said perimeter to define a plurality of fiber extensions, wherein at least a portion of said fiber extensions are discrete, single-fiber extensions; and (d) protective coatings around at least a portion of each of said fiber extensions, said protective coatings extending inwardly from said perimeter to provide strain relief for said each of said fiber extensions.

20 Claims, 1 Drawing Sheet

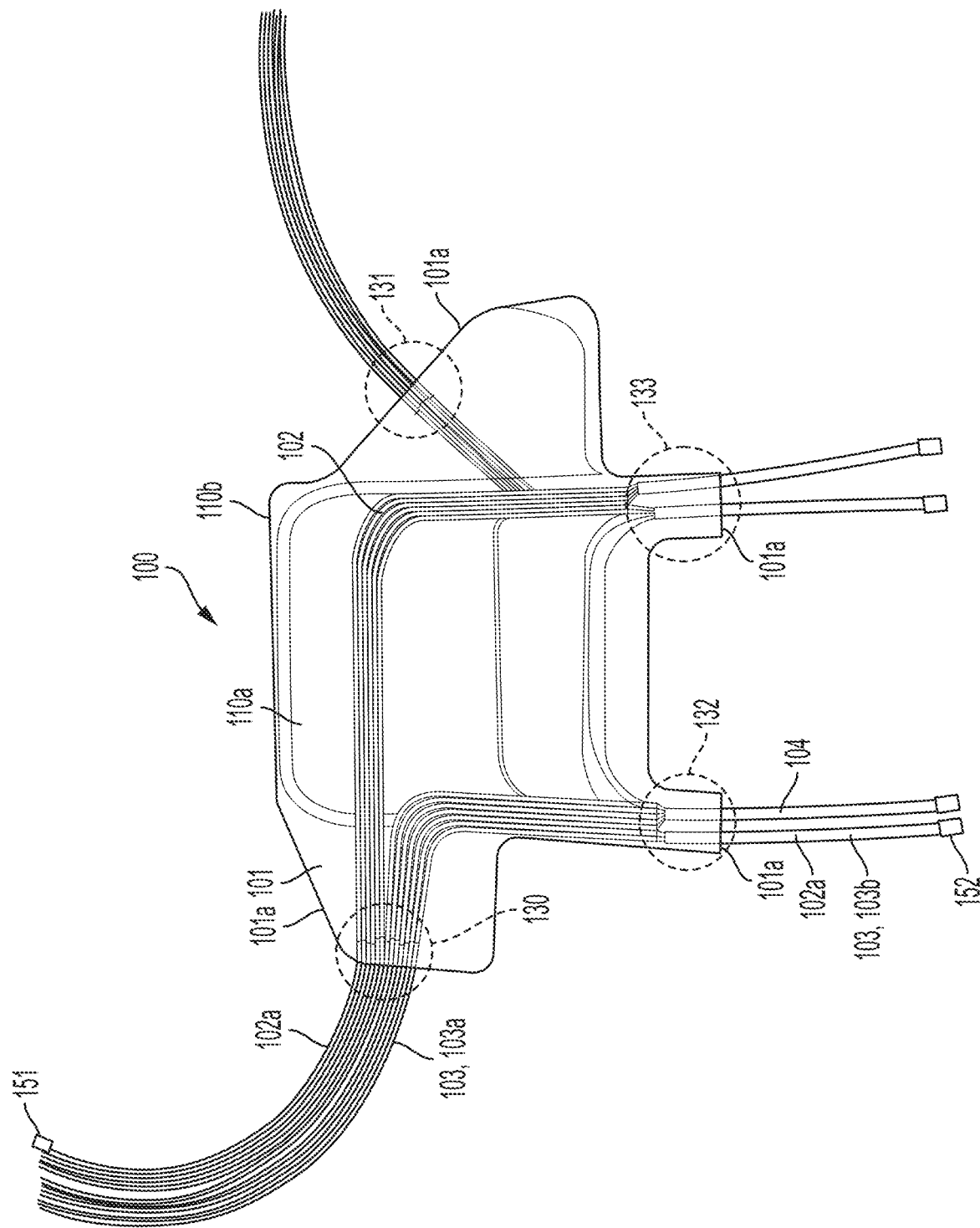

FLEXIBLE OPTICAL CIRCUIT WITH INTEGRATED FIBER BREAKOUT

FIELD OF INVENTION

The present invention relates generally to a flexible optical circuit, and, more particular, to a flexible optical circuit integrated with a fiber breakout.

BACKGROUND

The recent surge in demand for bandwidth is creating new challenges for designers of next generation optical networks and systems. In addition to a many-fold increase in the line rate of optical channels which now requires optical transmission, switching, cross-connection, etc., new multiplexing schemes are being implemented in order to efficiently transport, process and distribute information to end users. Thus back-planes, cross-connects and distributions panels become highly optical-connection-density intensive. This in turn results in a many-fold increase in the number of fiber optic jumpers and fan-out cables that are needed to interconnect the required optical connections in an orderly, manageable, predictable and cost-effective manner. This becomes a serious problem both in terms of space for dressing optical cables and cost for implementing and maintaining such systems. The situation is particular problematic in applications in which space is at a premium, such as, for example, in aircraft applications. Therefore, new approaches must be developed to address optical fiber congestion problems.

One approach for managing optical fibers is a flexible optical circuit. Such circuits are well known. A conventional flexible optical circuit comprises a flexible substrate having an adhesive surface upon which optical fibers are routed and secured such that the fibers are organized and held in place to maintain a minimum bend radius. A length of each fiber extends from the substrate. A conformal coating is typically applied over the substrate, and over the extending fibers to form ribbon cables. Thus, a typical flexible optical circuit comprises a flexible substrate from which ribbon fibers extend. Based upon the application, these ribbon cables are either terminated with a multi-fiber termini, or they are broken down into individual fibers in fiber breakouts and then terminated with single or multi-fiber termini. These are well-known configurations.

The flexible optical circuit configuration has been successful in meeting many of the demands of high density fiber routing. However, Applicant has determined that the conventional flexible optical circuit configuration are particular problematic in applications in which space is limited—e.g. aircraft applications. Specifically, because of the lightweight and zero electromagnetic interference (EMI) associated with optical fibers, they are preferred for aircraft applications, especially in high-performance aircraft such as jet fighters and the like. However, as the use of optical fibers increases in these applications, optical fiber management becomes more of a problem. For instance, Applicant has determined that in many cases, there is simply not enough space for the optical circuits and their associated breakouts in the allotted cable trays. This results in installers forcing optical circuit and their breakouts into limited space often straining the optical circuits and/or the fibers which can lead to diminished optical quality or premature failure.

Accordingly, Applicant identifies the need for a flexible optical circuit configuration having individual fiber breakouts with a minimal footprint. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to the integration of a fiber breakout into a flexible optical circuit. More specifically, Applicant recognizes that a discrete breakout adds significant complexity and size to the fiber circuit. Applicant further recognizes that the function of the breakout—i.e. fanning fibers from a ribbon cable—can be performed within the optical substrate itself. In other words, rather than having a discrete fiber breakout coupled to a ribbon fiber extending from the optical circuit, the fibers can be routed on the substrate such that they extend from the substrate as discrete fibers. Unlike the conventional approach, the conformal coating is no longer necessary to ribbonize the fibers extending from the substrate. However, Applicants recognize that individual fibers extending from the optical substrate will encounter strain along the perimeter of the optical substrate. Accordingly, Applicant discloses herein an approach for protecting the fibers either as a ribbon cable or as individual fibers as they extend past the perimeter of the flexible substrate. Therefore, the present invention provides for an optical flexible optical circuit that not only manages and secures fibers, but also integrates a fiber breakout to avoid the need for space-consuming discrete fiber breakouts as used in the prior art.

Accordingly, one aspect of the present invention is an optical flexible optical circuit having an integrated fiber breakout. In one embodiment, the optical circuit comprises: (a) a flexible substrate defining a perimeter; (b) an adhesive layer on at least a portion of the substrate; (c) a plurality of fibers laid out on the adhesive layer, wherein each end of each fiber of the plurality of fibers extends from the perimeter to define a plurality of fiber extensions, wherein at least a portion of the fiber extensions are discrete, single-fiber extensions; and (d) a protective coating around at least a portion of each of the fiber extensions, the protective coatings extending inwardly from the perimeter to provide strain relief for the each of the fiber extensions.

Another aspect of the invention is a method of preparing the optical circuit with an integrated fiber breakout. In one embodiment, the method comprises A method of making a flexible optical circuit comprising: (a) routing a plurality of fibers on an adhesive layer overlaying at least a portion of a flexible substrate defining a perimeter, wherein each end of each fiber of the plurality of fibers extends from the perimeter to define a plurality of fiber extensions, wherein at least a portion of the fiber extensions are discrete, single-fiber extensions; and (b) disposing a protective coating around at least a portion of each of the fiber extensions, the protective coatings extending inwardly from the perimeter to provide strain relief for the each of the fiber extensions.

BRIEF DESCRIPTION OF DRAWINGS

FIG. 1 shows one embodiment of a flexible optical circuit having an integrated fiber breakout.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Referring to FIG. 1, one embodiment of a flexible optical circuit 100 of the present invention is shown. Flexible optical circuit 100 comprises (a) a flexible substrate 101 defining a perimeter 101a; (b) an adhesive layer on at least a portion of the substrate; (c) a plurality of bare fibers 102 laid out on the adhesive layer, wherein each end of each fiber of the plurality of fibers extends from the perimeter to define a fiber extension 102a; and a protective coating 103 around at least a portion of the fiber extension, the protective coating extending across the perimeter, thereby providing strain relief in the each fiber at the perimeter.

These features will be described are described below in greater detail and in connection with selected alternative embodiments.

The flexible substrate functions to provide a flexible support for the fibers. In one embodiment, the optical substrate comprises features for facilitating mechanical connection to a structure such as a cable tray or panel. For example, in one embodiment, the substrate comprises orifices to receive fasteners. Still other mechanical connection features will be known to those of skill in the art in light of this disclosure. The flexible substrate may comprise any known flexible substrate material including, for example, polyimide film (e.g., Kapton® from DuPont), Polyester Films (e.g., Mylar® Polyester Film), Metalized Polyester Film, PET Polyester Film, APET Polyethylene Teraphthalate Film, PETG Polyester Teraphthalate Glycol Film (e.g., Valox® Polyester).

An adhesive layer covers at least a portion of the flexible substrate. The function of the adhesive layer is to secure the optical fibers once they are routed on the substrate. Often, substrates are commercially available with an adhesive layer already applied. Again, such adhesives are well known and will not be considered in detail herein. Suffice to say that typical adhesives are 300468 & 9375W 3M Adhesive.

Optical fibers are routed on the adhesive layer. Fiber routing configurations on flexible optical circuits are well-known. For example, in one embodiment, the configuration might be a fiber shuffle in which a fiber for one group is split off and combined with fibers in a different group. In another embodiment, the configuration might be a plurality of discrete fibers grouped together to form one or more ribbon cables. The apparatus and techniques for doing this are well known. For example, suitable optical fiber routing machines are available from TEGEMA (Netherlands). In one embodiment, the routing machine lays fiber not only on the substrate, but also on a tacky film beyond the perimeter of the substrate. The tacky film is well known to those of skill in the art and functions to secure/manage the fiber extensions temporarily.

As mentioned above, an important feature of the claimed invention is that the breakout of the fibers occurs in the substrate and not in a discrete breakout component. This saves considerable space and simplifies fiber management. Accordingly, in one embodiment, at least a portion of the fibers extend individually from the substrate. For example, referring to FIG. 1, optical fibers are routed on the substrate 101 such that a portion of the fiber extensions 102a extend as single fibers from groupings 130 and 131. Additionally, in this embodiment, a portion of fiber extensions 102 extend from the substrate as ribbon fiber as shown in groupings 132 and 133.

One of skill in the art will appreciate that the fibers may be routed and grouped as required by the application, meaning that the fiber extensions 102a maybe discrete single fibers, groupings of single fibers, or multiple fibers configured as ribbon fibers. There is no limitation as to the type and number of fiber groupings. Additionally, it should be recognized that although FIG. 1 shows groupings of single fibers concentrated in groupings 130 and 131, other embodiments are possible. For example, rather than concentrating the single fibers in groups along the perimeter, they may be instead dispersed along the substrate's perimeter, which may be preferable in some applications to properly fanout the fibers. Again, one of skill in the art will determine the optimum fiber routing configuration in light of this disclosure.

Another important feature of the claimed invention of the present invention is that for fiber extensions are protected by a protective covering 103. By way of background, as mentioned above, in a conventional optical circuit, the extending fibers would be protected by a conformal coating used to ribbonize the fiber extensions. However, as disclosed herein, at least a portion of the fibers extending from the substrate are discrete fibers (i.e. not ribbonized), and thus are not suited for conformal coating. However, Applicant appreciates that the fiber strain is likely to occur at the perimeter of the substrate because the fiber on the substrate is anchored to the substrate, while its extending end is free to move. Therefore, to overcome this potential strain, the fiber extensions 102a are covered by protective covering along the perimeter of the substrate.

The protective covering may be any known covering for an optical fiber or cable assembly. For example, for a single fiber it may be any known flexible furcation tubing, such as, for example, PVC, and, for a grouping of fibers, it may be a heat-shrink polyolefin tubing as disclosed in U.S. application Ser. No. 16/249,810, hereby incorporated by reference. Alternatively, multiple fibers may be ribbonized using a conformal coating as discussed above.

Although the method for applying the protective coating on the fibers may vary, and one embodiment, individual fibers are lifted from tacky film described above, and the furcation tubing slid over them. In multiple fiber groupings, a heat-shrink polyolefin tubing as maybe slid over the fibers as described in U.S. application Ser. No. 16/249,810. These are simple, straightforward approaches for applying protective covering to the fibers. Those of skill in the art, in light of this disclosure, are likely to develop alternative methods for disposing protective covering over the fibers.

Applicant has found that it is important for the protective covering to extend inwardly from the perimeter of the substrate. Generally, a larger lap of protective covering across the perimeter of the substrate is preferred to reduce stress. Those of skill in the art can determine the extent of this lap—i.e. how far inward the protective covering needs to extend within the perimeter to provide sufficient strain relief. In one embodiment, the protective covering extends inwardly from the perimeter of the substrate at least 5 mm, and, in another embodiment, at least 7 mm, and, in another embodiment, at least 10 mm.

At some point, extending the protective coating inward of the perimeter of the substrate has diminished benefit as the substrate/adhesive provides adequate support and strain relief for the fiber. Again, those of skill the art can determine the point at which the protective coating is no longer improving strain relief. Additionally, at some point, the fiber needs to be routed, as described above, which involves bending the fiber. Such routing may be impeded by the protective coating. Thus, in a preferred embodiment, the protective coating extends inward of the perimeter, but not to the point at which the fiber is curved. Accordingly, in one embodiment, the protective coating does not extend inward from the perimeter more than 25 mm, and, in another embodiment, more than 20 mm.

In one embodiment, opposing flexible substrates 110a, 110b are used. In other words, the substrate may comprise opposed first and second substrates 110a, 110b configured to sandwich the adhesive layer and at least a portion of the plurality of fibers. More specifically, in one embodiment, once the fibers are routed on the substrate 110a and the protective coverings are disposed on the fiber extensions, a second substrate 110b, mirroring the first substrate, may be applied over the top of the first substrate. Such an embodiment serves a number of functions. First, the second substrate provides additional strength and covers the fibers to prevent abrasion or other environmental assault of the fibers. Additionally, the second substrate covers the adhesive layer such that debris and other contaminants are not inadvertently glued to the substrate.

Alternatively, rather than, or in addition to, a second substrate as described herein, a conformal coating can be applied over the adhesive layer and routed fibers providing that the single fiber extensions, or groupings of fiber extensions that are intended for a heat shrink protective coating, are masked from the conformal coating. It should be noted that, as mentioned below, it may be preferable to apply a conformal coating on multiple fibers which are intended to be ribbonized.

In one embodiment, the substrate(s) with the adhesive layer are heat-treated/baked to ruggedized the flexible optical circuit. The temperatures for heat treating will be obvious to those of skill in the art in light of this disclosure. Suitable results have been obtained with heat treating in the range of 70 to 85° C.

In one embodiment, the fiber extensions are terminated either with a multi-fiber termini 150 in the case of a multifiber grouping, or with a single terminus 151 in the case of a discrete fiber. The termini may be any known configuration including traditional ferrules. For example, single fiber ferrules may include, for example, LC or SC ferrules, and, multifiber ferrules may include, for example, MT ferrules.

These and other advantages maybe realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

What is claimed is:

1. A flexible optical circuit comprising:
    a flexible substrate defining a perimeter;
    an adhesive layer on at least a portion of said substrate;
    a plurality of fibers laid out lengthwise on said adhesive layer, wherein each end of each fiber of said plurality of fibers extends from said perimeter to define a plurality of fiber extensions, wherein at least a portion of said fiber extensions are discrete, single-fiber extensions; and
    protective coatings around at least a portion of each of said fiber extensions, said protective coatings extending inwardly from said perimeter to provide strain relief for said each of said fiber extensions.

2. The flexible optical circuit of claim 1, wherein said protective coating extends at least 3 mm inward of said perimeter.

3. The flexible optical circuit of claim 2, wherein said protective coating extends at least 5 mm inward of said perimeter.

4. The flexible optical circuit of claim 1, wherein said protective coating extends no more than 25 mm inward of said perimeter.

5. The flexible optical circuit of claim 4, wherein said protective coating extends no more than 20 mm inward of said perimeter.

6. The flexible optical circuit of claim 1, wherein said substrate comprises opposed first and second substrates 110a, 110b configured to sandwich said adhesive layer and at least a portion of said plurality of fibers.

7. The flexible optical circuit of claim 1, further comprising a conformal coating covering said adhesive layer and at least a portion of said plurality of fibers.

8. A flexible optical circuit comprising:
    a flexible substrate defining a perimeter;
    an adhesive layer on at least a portion of said substrate;
    a plurality of fibers laid out on said adhesive layer, wherein each end of each fiber of said plurality of fibers extends from said perimeter to define a plurality of fiber extensions, wherein at least a portion of said fiber extensions are discrete, single-fiber extensions; and
    protective coatings around at least a portion of each of said fiber extensions, said protective coatings extending inwardly from said perimeter to provide strain relief for said each of said fiber extensions;
    wherein said fiber extensions define at least two groupings, a first of said two groupings comprises said portion of said fiber extensions, and a second of said two groupings comprises multiple fibers of said fiber extensions.

9. The flexible optical circuit of claim 8, wherein said multiple fibers are combined to define a ribbon cable.

10. The flexible optical circuit of claim 9, wherein said multiple fibers are ribbonized.

11. The flexible optical circuit of claim 9, wherein said ribbon cable is terminated with a termini.

12. A method of making a flexible optical circuit comprising:
    routing a plurality of fibers lengthwise on an adhesive layer overlaying at least a portion of a flexible substrate defining a perimeter, wherein each end of each fiber of said plurality of fibers extends from said perimeter to define a plurality of fiber extensions, wherein at least a portion of said fiber extensions are discrete, single-fiber extensions; and disposing a protective coating around at least a portion of each of said fiber extensions, said protective coatings extending inwardly from said perimeter to provide strain relief for said each of said fiber extensions.

13. The method of claim 12, wherein said protective coating extends at least 3 mm inward of said perimeter.

14. The method of claim 12, wherein said protective coating extends no more than 25 mm inward of said perimeter.

15. The method of claim 12, further comprising applying a second substrate over at least a portion of said plurality of fibers such that said at least a portion of said plurality of fibers is sandwiched between said substrate and said second substrate.

16. The method of claim 12, further comprising a conformal coating covering said adhesive layer and at least a portion of said plurality of fibers.

17. The method of claim 12, wherein said fiber extensions define at least first and second groupings, said first grouping comprises discrete said fiber extensions, and said second grouping comprises multiple said fiber extensions.

18. The method of claim 17, wherein disposing protective coatings comprises combining said second grouping.

19. The method of claim 18, wherein disposing protective coatings comprising ribbonizing said second grouping.

20. The method of claim 19, further comprising terminating said ribbon cable with a termini.

\* \* \* \* \*